July 25, 1961  O. E. ESVAL  2,993,625
CONTINUOUS INTEGRATOR WEIGHING APPARATUS
Filed Feb. 11, 1960  3 Sheets-Sheet 1
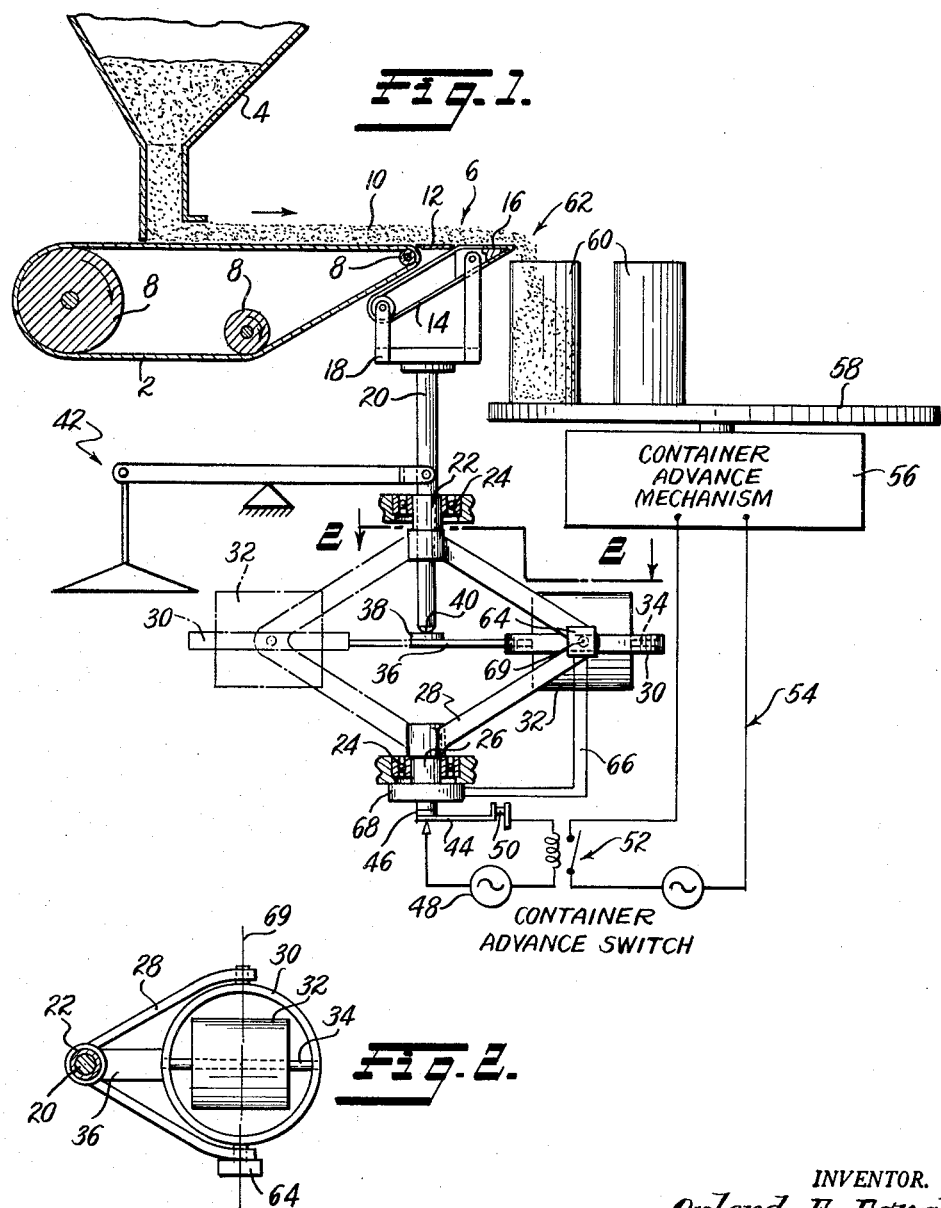
INVENTOR.
Orland E. Esval
BY
Bacon & Thomas
ATTORNEYS

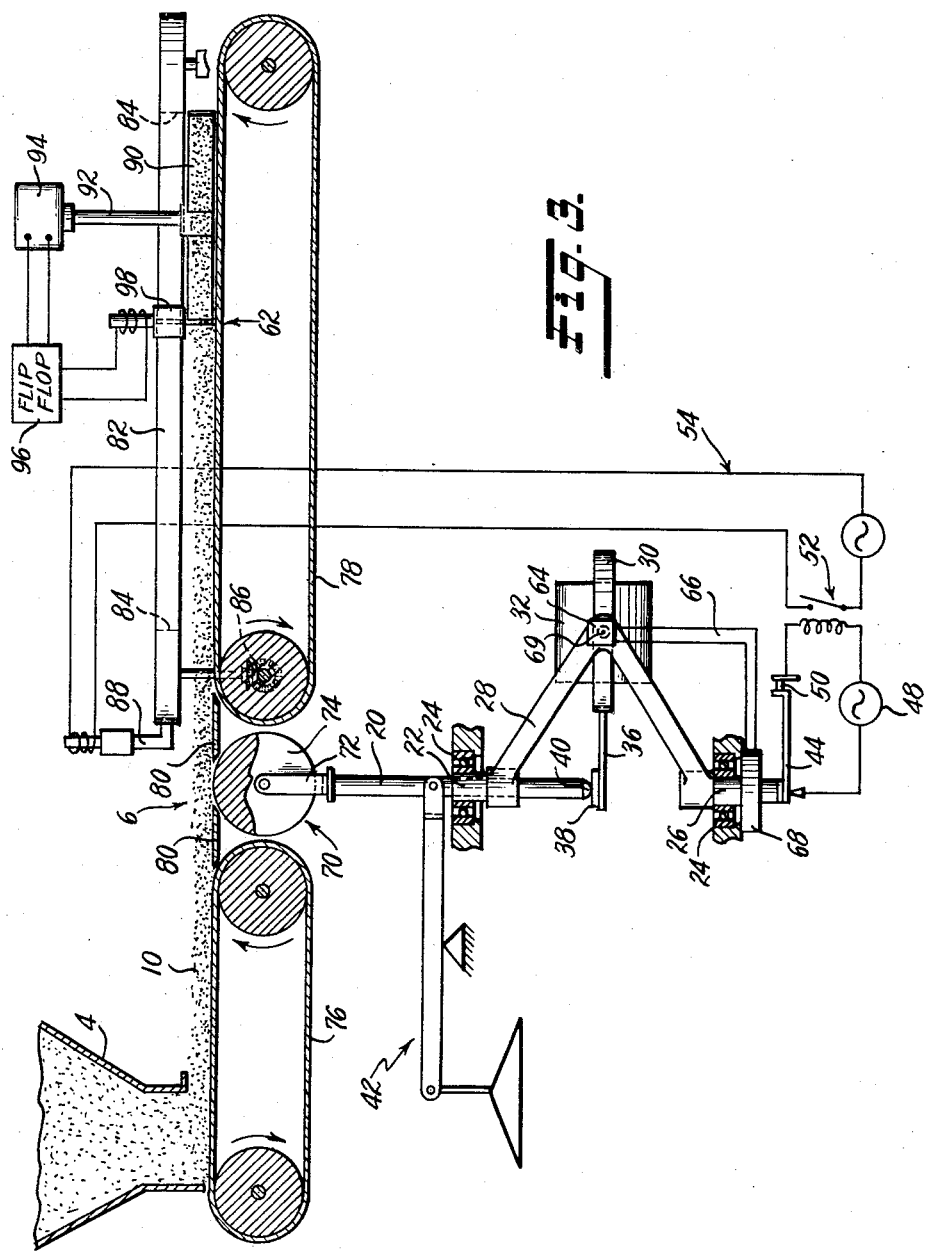

July 25, 1961
O. E. ESVAL
2,993,625
CONTINUOUS INTEGRATOR WEIGHING APPARATUS
Filed Feb. 11, 1960
3 Sheets-Sheet 3
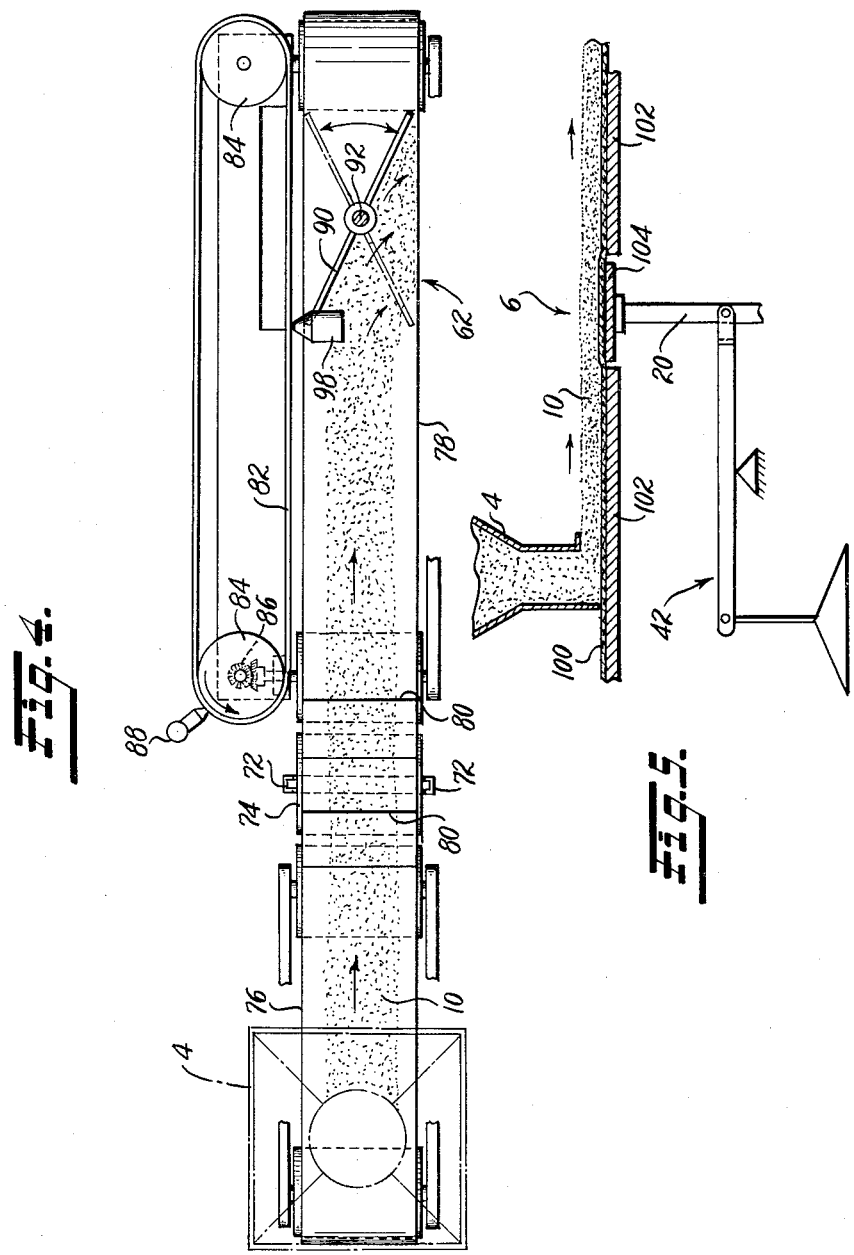
INVENTOR.
Orland E. Esval
BY
Bacon & Thomas
ATTORNEYS United States Patent Office 2,993,625
Patented July 25, 1961

2,993,625
CONTINUOUS INTEGRATOR WEIGHING
APPARATUS
Orland E. Esval, Durham, N.C., assignor to Sperry Rand
Corporation, Wilmington, Del., a corporation of Delaware
Filed Feb. 11, 1960, Ser. No. 8,036
13 Claims. (Cl. 222—55)

This invention relates to weighing apparatus, and particularly to apparatus of the type where a stream of continuously moving material is weighed by integrating, with respect to time, sequential increments of mass of said stream as they pass through a weighing station even though the depth or density of the stream may vary and the sequential increments are not equal.

The basic principles of the invention comprise means for conveying a continuously moving but variable density stream of material at a uniform horizontal velocity over a weighing device at a weighing station and then on to a delivery station so that each particle of material makes transit of the weighing device in exactly the same interval of time.

A definite length of the stream of material, moving at a constant speed, at the weighing station is supported by the weighing device whereby that increment of the stream exerts a downward force on the device. Integrating mechanism responds to that force to integrate the total force-time function and to cause a control element to effect the desired disposition of a predetermined length of said stream after the integrated total reaches a predetermined value. In other words, each increment of mass passing through the weighing station is added to the mass of each preceding increment until the integrator indicates a predetermined total, at which time it is known that the desired weight of material has passed through the weighing station. Suitable means responsive to the indicator are provided for breaking up the stream into increments of the desired weight in response to the operation of the integrator.

In a preferred form the integrator comprises a gyroscope mounted for rotation about a horizontal spin axis. The weight of material at the weighing station is detected as a downward force on the weighing device and is applied as a torque or couple to the gyro mechanism in such manner as to cause precession thereof about a vertical axis. As is a well-known characteristic of gyroscopes, the rate of precession about the vertical axis is directly proportional to the force or torque causing that precession. Therefore, the total rotation of the gyro mechanism about its precession axis is proportional to the total weight material that has passed through the weighing station. Although a gyroscopic integrator is the preferred form, other types of force integrators may be used. These could be either analog or digital, in which case readings would be taken at a high repetition rate and totalized in an accumulator circuit.

It is, therefore, an object of this invention to provide a continuous integrator weighing apparatus for determinating the lengths of portions of a stream of material having predetermined total weight and separating the stream into such portions.

Another object is to provide a continuous integrator weighing apparatus employing a gyroscopic integrator.

Still another object is to provide a weighing apparatus of the type set forth wherein sequential increments of a stream of material are deposited in successive containers and wherein the integrating function controls the movements of the containers.

A further object is to provide a weighing apparatus of the type set forth wherein a weighing station and a delivery station are remotely separated and wherein the stream is separated into increments of predetermined weight at the delivery station in response to a weighing function performed at the weighing station.

A still further object is to provide a weighing apparatus as set forth employing a novel gyroscopic integrating device and novel mechanisms for effecting the objects set forth.

An additional object of the invention is to provide a weighing apparatus that is simple in construction yet highly sensitive, accurate, rapid, and reliable in operation.

Further and additional objects and advantages will become apparent to those skilled in the art as the description proceeds with reference to the accompanying drawings, wherein:

FIG. 1 is a schematic side view of an apparatus embodying the present invention and showing one form thereof;

FIG. 2 is a horizontal sectional view taken substantially along the line 2—2 of FIG. 1;

FIG. 3 is a schematic view in side elevation of a further embodiment of the invention;

FIG. 4 is a schematic top plan view of the embodiment shown in FIG. 3; and

FIG. 5 is a fragmentary vertical sectional view schematically showing a still further embodiment.

Referring first to FIG. 1, an endless belt conveyor 2 is shown as receiving and conveying a stream of material 10 to be weighed, from a hopper 4, and delivering the same to a weighing station designated by numeral 6. The conveyor 2 is supported and driven by suitable rollers 8, any one of which may be the driving roller, but it is necessary that the conveyor 2 be driven at an accurately uniform rate. The conveyor 2 causes the stream of material 10, conveyed thereby, to pass over a bridge plate 12 onto a further endless belt conveyor 14. The conveyor 14 defines the weighing station 6 and is provided with an upper run portion 16 substantially horizontal and defining a continuation of the conveyor 2. The conveyor 14 is driven by a motor or the like (not shown) at exactly the same uniform linear speed as the conveyor belt 2. The conveyor 14 is mounted on a suitable bracket structure 18 carried by vertical shaft 20. The vertical shaft 20 passes slidably through a hollow trunnion 22 which is in turn mounted in bearings 24 on a portion of the machine frame. The trunnion 22 is axially aligned with a second trunnion 26 which is likewise mounted in a bearing 24 on the machine frame. The trunnions 22 and 26 comprise portions of a yoke 28 which is thereby journalled for rotation about a vertical axis coaxial with the vertical axis of the shaft 20. The yoke 28 is provided with two arms diverging outwardly from the axis of trunnions 22 and 26, as best seen in FIG. 2, and at the ends of the arms a gimbal 30 is journalled on a horizontal axis 69 which is laterally displaced from the vertical axis previously described. A gyroscope 32 is journalled for rotation in the gimbal 30 on a spin axis defined by shaft 34, which axis is substantially perpendicular to the axis 69 on which the gimbal 30 is journalled and radial to the vertical axis of trunnions 22 and 26. Suitable means, not shown, are provided for rotating the gyroscope 32 at a predetermined accurately controlled uniform speed, preferably a synchronous motor is employed for this purpose, and the rotor of the motor may be the gyroscope itself, all as is well known.

Rigidly fixed to the gimbal 30 is an arm 36 extending therefrom in a direction radial to the vertical axis of trunnions 22 and 26. The arm 36 is provided with a pressure pad 38 which is substantially centrally intersected by the axis of trunnions 22 and 26. Thus the pad 38 is always intersected by the described vertical axis even though the yoke 28 rotates in a horizontal plane. The weight of arm 36 and pad 38 are counterbalanced about axis 69 by a weight (not shown) on the outer side of gimbal 30. The vertical shaft 20 is provided with a rounded (or pointed) lower end 40 bearing upon the pad 38. A counterbalance generally designated at 42 counterbalances the weight of the shaft 20, bracket 18 and conveyor 14 so that, in the absence of material 10 on the conveyor 14, no force is applied by the shaft 20 to the pad 38. Therefore, in operation the only downward force applied to the pad 38 is that produced by the weight of the material 10 resting on the device comprising the conveyor 14. While a weight and lever are shown as the counterbalancing means, obviously springs could be used for that purpose.

As is well known, any downward force applied to the pad 38 applies a torque about the mounting axis 69 of gimbal 30 and therefore tends to tilt the spin axis of gyro 32. Such tilting torque causes the gyro to precess in a horizontal direction about the vertical axis of trunnions 22 and 26, which is a well-known characteristic of gyroscopic structures. Since the gyro is balanced about axis 69 the rate at which the gyroscope precesses about the vertical axis is directly proportional to the downward force applied to pad 38 and that rate changes instantly in response to variations in density of the stream 10. Therefore, the total rotation of the yoke 28 about its vertical axis is an integration of the force applied to pad 38 with respect to time. In other words, a predetermined angle of rotation of the yoke 28 about its vertical axis indicates that a predetermined total weight of material 10 has passed over the conveyor or weighing device 14.

By way of example the trunnion 26 is provided with a radial arm 44, which is an electrical conductor. The arm 44 is preferably mounted on the trunnion 26 through insulating material 46. The arm 44 is otherwise rigidly attached to the trunnion 26 and rotates therewith. A source of electrical energy 48 is connected to the central portion of the arm 44 in any suitable manner and to a stationary contact 50 in series with the coil of a relay 52. The stationary contact 50 is so positioned that the outer end of arm 44 engages the same at each revolution of the yoke 28. Thus, each time the yoke 28 makes one complete revolution a circuit is completed through the relay 52 to close the same and energize a circuit 54 controlling the container advance mechanism 56. The container advance mechanism 56 is shown as controlling the rotation of a conveyor-carrying turntable 58. The turntable 58 is adapted to have containers 60 positioned thereon and to sequentially move said containers in position to receive material discharged from the end of conveyor device 14, which position, in this embodiment, constitutes a delivery station 62.

Obviously, the number of contacts 44 on the yoke 28 of this and the other embodiments could be increased to any desired number, depending upon the weights desired.

The speed of rotation of gyroscope 32 and the speed of rotation of the conveyors 2 and 14 is so regulated that precession of the gyroscope 32 to produce one complete turn of yoke 28 (or successive actuations of relay 52) occurs after the desired weight of material has passed over the conveyor device 14 and is received in the container at the delivery station. After such a complete revolution of yoke 28, control circuit 54 is energized in the manner described to actuate the container advance mechanism 56 to position an empty container at the delivery station. In this manner material is constantly and continuously conveyed along a path through the weighing and delivery stations, and successive containers are moved into the delivery station to receive a predetermined weight of material. In this manner the stream of material 10 is separated into increments of equal weight.

Friction in the pivots and bearings of the gyroscope mechanism normally result in a progressive tilting of the gyroscope spin axis. It is important, however, that such spin axis be maintained uniformly level. For this purpose a sensing device 64 is provided on the yoke 28 to detect any tilt of the gyro spin axis from the horizontal and to generate a corresponding signal which is transmitted through circuit 66, to a torque-applying device 68 connected to the trunnion 26. The torque is applied to the trunnion in a proper direction to cause the gyroscope to precess back to the horizontal position. Means for applying such a torque to the trunnions 26 are shown only schematically at 68. Such correcting means are well known in gyroscopic arts and need not be further described herein.

Referring now to FIGS. 3 and 4, the gyroscopic control mechanism is exactly the same as that described in connection with FIG. 1 and the same reference numerals indicate identical parts. In this form, however, the conveyor weighing device 14 is replaced by a different weighing device 70 comprising a bracket 72 on shaft 20 and a roller 74 journalled thereon. Means (not shown) are provided for rotating the roller 74 at a peripheral speed exactly equal to the linear speed of conveyor belt 76 which is driven at an accurately uniform speed. A second endless belt conveyor 78, driven at exactly the same speed as the belt 76, is positioned in alignment with the belt 76 and the upper surface of roller 74. If necessary, suitable bridge plates 80 are provided to span the gaps between roller 74 and belts 76 and 78, respectively. Hopper 4 supplies a stream of material 10 to conveyor belt 76 which material is thereby conveyed through the weighing station 6, defined by roller 74 and thence onto conveyor 78. Thus it will be seen that the weight of material supported by roller 74 is effective to exert a downward force on pad 38 to cause integrating precession of gyroscope 32 in the manner previously described.

A signalling means comprising a further endless belt or filament 82 is mounted on suitable guiding and driving wheels 84 and is driven at exactly the same linear speed as conveyor belt 78. In the embodiment shown a roller 84 is connected, through bevel gears 86, to one of the rollers supporting the endless bent 78 whereby the filament 82 is arranged with a "run" adjacent and parallel to belt 78 and both are driven at exactly the same linear speed. The filament 82 is of a magnetizable material and may be in the form of a wire or tape. A magnetizing head 88 is mounted adjacent a portion of the filament 82 and is so located that the portion of the filament 82 opposite the head 88 at any given instant will eventually move alongside belt 78 to be exactly opposite that portion of the stream of material 10 that was at the weighing station at that given instant.

The delivery station 62 is defined by the leading edge of a sweep paddle 90 carried by a vertical shaft 92 extending upwardly from the upper run of belt 78 and substantially centrally thereof to a control motor 94. The motor 94 is effective to turn the shaft 92 through a small angle to position the paddle 90 in either the full line position shown in FIG. 4 or the dotted line position shown in that figure. The motor 94 is controlled by a flip-flop circuit device shown schematically at 96 and electrically connected to a reading head 98 positioned adjacent the filament 82 at the delivery station 62.

As will be obvious, when the paddle 90 is in the full line position of FIG. 4, the material 10 on belt 78 is diverted and swept off the belt on one side thereof. When the paddle 90 is in the dotted line position of FIG. 4 the material 10 is diverted and swept off belt 78 on the other side thereof. Thus the sweep paddle 90 is effective to separate the stream of material into different portions which may be received by any suitable mechanism and disposed of in any desired manner.

As will be obvious, the relay 52 is actuated periodically each time a predetermined weight of material has passed through weighing station 6. Actuation of relay 52 causes an electric impulse to be applied to the magnetizing head 88 and thus to apply a magnetic signal on the filament 82. The signal on 82, as previously described, moves along with belt 78 in a position exactly opposite that portion of material that was on the roller 74 when arm 44 engaged contact 50. Thus the signal on the filament 82 defines that position on the stream of material 10 at which the stream is to be separated at some remote point to effect the desired division of weight. When the magnetic signal on filament 82 reaches reading head 98 at delivery station 62, it causes actuation of the flip-flop device 96 to energize motor 94 and thereby turn the sweep paddle 90 so that the leading edge thereof separates the stream of material 10 at the required position and to divert the stream along a different delivery path until another predetermined weight quantity of material reaches the delivery station. It is also necessary that a suitable "erasing" device (not shown) be provided to erase the magnetic signal from element 82 after it has passed the reading head 98 and before it reaches the magnetizing head 88. Such erasing devices are well known in magnetic recording arts and need not be further described. To facilitate illustration, the erasing device is omitted from the drawings.

While filament 82 is shown herein separate from belt 78, it is obvious that it could in fact be a portion of belt 78 itself or a separate filament supported on and driven by the same rollers that support and drive belt 78.

It will further be obvious to those skilled in the art that the magnetizing head 88 could be operated to place signals on filament 82 corresponding to small increments of weight and reading head 98 and device 96 could be set to actuate means corresponding to sweep paddle 90 after passage of any desired number of magnetic signals through the delivery station.

FIG. 5 illustrates a still further embodiment of the invention. In FIG. 5 like reference numerals identify parts identical to those described in the previous embodiments. In this form, however, a single continuous conveyor belt 100 conveys the stream of material 10 through the weighing station 6 and on to delivery station 62 (not shown). Throughout all of its length except at the weighing station 6, the belt 100 is supported by suitable frame members 102. At the weighing station 6, however, the belt passes over and is supported by a platform 104 mounted on the upper end of shaft 20. The counterbalancing device 42 is so adjusted that it exactly counterbalances the weight of the shaft 20 and platform 104 and also the weight of that portion of belt 100 resting on plate 104. The operation of this embodiment will be obvious to those skilled in the art and it is sufficient to say that only the weight of material supported by the plate 104 is effective to produce a precessing force on pad 38 with the same results and for the same purpose as heretofore described in connection with the previous embodiments.

While a limited number of specific embodiments of the invention are shown and described herein, it is to be understood that other forms may be resorted to within the scope of the appended claims.

I claim:

1. Weighing apparatus comprising, conveying means for conveying a continuous stream of material to be weighed along a predetermined path through a weighing station to a delivery station with each increment of said stream being in said weighing station a predetermined uniform length of time, said conveying means including a device at said weighing station arranged to support the static downward force of a predetermined length of said continuous stream as it passes through said weighing station, integrating means responsive to said downward force exerted by material on said device for integrating said force with respect to time, and material control means at said delivery station and responsive to said integrating means for controlling said stream at said delivery station to separate said stream into portions of predetermined weight.

2. Apparatus as defined in claim 1 wherein said integrating means comprises a gyroscope, means for causing said gyroscope to precess at a rate proportional to said downward force, and means responsive to a predetermined precession of said gyroscope for actuating said material control means.

3. Apparatus as defined in claim 1 wherein said material control means comprises means for directing sequentially separated portions of said steam along different discharge paths.

4. Apparatus as defined in claim 1 wherein said conveying means includes a first conveyor for carrying said material to said weighing station and said device comprises a second conveyor aligned with said first conveyor along said path, said second conveyor being mounted for vertical movement under the influence of the weight of material thereon.

5. Apparatus as defined in claim 1 wherein said conveying means comprises an endless conveyor belt passing through said weighing station, said device comprising a vertically movable structure supporting a portion of said conveyor belt and the material thereon.

6. Apparatus as defined in claim 1 wherein said weighing station and said delivery station are spaced apart along said path, signalling means movable parallel to and adjacent said path and means for moving said signalling means at the same rate as the material moving along said path, means adjacent said weighing station responsive to said integrator for fixing a detectable signal on said signalling means, detecting means at said delivery station for detecting the arrival of said detectable signal and thereupon actuating said material control means.

7. Apparatus as defined in claim 6 wherein said signalling means comprises a magnetizable filament, said means responsive to said integrator comprising a magnetizing head for magnetizing a portion of said filament, said detecting means comprising a detecting head adjacent said filament for detecting arrival of said magnetized portion of said filament.

8. Apparatus as defined in claim 7 wherein said conveying means includes an endless conveyor belt for conveying said stream from said weighing station to said delivery station, said filament being an endless filament having a portion extending between said stations parallel to said stream, and means for driving said endless belt and filament at the same uniform linear speed.

9. Weighing apparatus comprising, conveying means for conveying a continuous stream of material to be weighed along a predetermined path through a weighing station to a delivery station at a uniform speed, said conveying means including a device at said weighing station arranged to support the weight of a predetermined length of said continuous stream as it passes through said weighing station, a gyroscope including a rotor mounted for rotation about a horizontal spin axis, further means mounting said gyroscope for rotation about a second horizontal axis substantially perpendicular to said spin axis and also about a vertical axis, means operable by said device for applying a torque to said gyroscope, about said second axis, proportional to the weight of said material supported by said device whereby said gyroscope is caused to precess about said vertical axis at a rate proportional to said torque, material control means for controlling said stream at said delivery station to separate said stream into separate portions, and means responsive to precession of said gyroscope about said vertical axis through a predetermined angle for actuating said material control means.

10. Apparatus as defined in claim 9 wherein said rotor is mounted for rotation in a gimbal which in turn is mounted for rotation about said second axis, said vertical axis being laterally displaced from said gimbal, said device being mounted for vertical movement under the influence of the weight of material thereon and having a movable portion movable along said vertical axis, said gimbal including a bearing portion intersected by said vertical axis and engaging said movable portion whereby the weight of material on said device applies said torque to said gimbal.

11. Apparatus as defined in claim 10 including means for counterbalancing the weight of said device whereby torque is applied to said gimbal solely by the weight of the material supported by said device.

12. An apparatus for integrating the mass of a quantity of material comprising; means for conveying said material at a constant velocity, a gyroscope mounted for precessing movement, means for applying the weight of successive particles of said material, for a predetermined period of time, to said gyroscope as a couple to cause precession of the same, the total precession thereof being directly proportional to the total mass of said quantity of material, and means to measure said total precession as a measure of said mass.

13. The method of integrating the mass of a quantity of material comprising, the steps of; sequentially moving successive particles of said material along a path, successively applying the weight of successive moving particles, and for equal periods of time, eccentrically to a gyroscope mounted for universal pivotal movement to cause precession of the same, the total precession thereof being proportional to the total mass of said quantity of material and measuring said total precession to determine said mass.

References Cited in the file of this patent

UNITED STATES PATENTS

| | | |
|---|---|---|
| 2,727,669 | Sackett | Dec. 20, 1955 |
| 2,882,937 | Kay | Apr. 21, 1959 |
| 2,882,938 | Kay | Apr. 21, 1959 |
| 2,920,794 | Bauder et al. | Jan. 12, 1960 |